(No Model.) 12 Sheets—Sheet 1.
P. KENNEDY, C. J. DISS & R. CANNAN.
MACHINE FOR MAKING BRUSHES.

No. 469,479. Patented Feb. 23, 1892.

Fig. 1.

Witnesses:
J. Staib
Chas. H. Smith

Inventors:
Patrick Kennedy
Charles J. Diss
Robert Cannan
per Lemuel W. Serrell
Atty

(No Model.) 12 Sheets—Sheet 2.

P. KENNEDY, C. J. DISS & R. CANNAN.
MACHINE FOR MAKING BRUSHES.

No. 469,479. Patented Feb. 23, 1892.

Witnesses:
J. Staib
Chas H Smith

Inventors:
Patrick Kennedy
Charles J. Diss
Robert Cannan
per Lemuel W. Serrell Atty (No Model.) 12 Sheets—Sheet 3.

P. KENNEDY, C. J. DISS & R. CANNAN.
MACHINE FOR MAKING BRUSHES.

No. 469,479. Patented Feb. 23, 1892.

Fig. 4.

Witnesses:
J. Staib
Chas. N. Smith

Inventors:
Patrick Kennedy
Charles J. Diss
Robert Cannan
per Lemuel W. Serrell
Atty.

THE NORRIS PETERS CO., PHOTO-LITHO., WASHINGTON, D. C.

(No Model.) 12 Sheets—Sheet 4.

P. KENNEDY, C. J. DISS & R. CANNAN.
MACHINE FOR MAKING BRUSHES.

No. 469,479. Patented Feb. 23, 1892.

Witnesses:
J. Staib
Chas H Smith

Inventors
Patrick Kennedy
Charles J. Diss
Robert Cannan
per Lemuel W. Serrell
Atty.

(No Model.) 12 Sheets—Sheet 5.

P. KENNEDY, C. J. DISS & R. CANNAN.
MACHINE FOR MAKING BRUSHES.

No. 469,479. Patented Feb. 23, 1892.

Witnesses:
J. Stail
Chas H Smith

Inventors:
Patrick Kennedy
Charles J. Diss
Robert Cannan
per Lemuel W. Serrell
Atty.

(No Model.) 12 Sheets—Sheet 6.

P. KENNEDY, C. J. DISS & R. CANNAN.
MACHINE FOR MAKING BRUSHES.

No. 469,479. Patented Feb. 23, 1892.

Inventors.
Patrick Kennedy
Charles J. Diss
Robert Cannan
per Lemuel W. Serrell
Atty Witnesses:
J. Stait
Chas. H. Smith (No Model.) 12 Sheets—Sheet 7.

P. KENNEDY, C. J. DISS & R. CANNAN.
MACHINE FOR MAKING BRUSHES.

No. 469,479. Patented Feb. 23, 1892.

(No Model.) 12 Sheets—Sheet 8.

P. KENNEDY, C. J. DISS & R. CANNAN.
MACHINE FOR MAKING BRUSHES.

No. 469,479. Patented Feb. 23, 1892.

Witnesses:
J. Staib
Chas. H. Smith

Inventors:
Patrick Kennedy
Charles J. Diss
Robert Cannan
per Lemuel W. Serrell
atty

(No Model.) 12 Sheets—Sheet 9.

P. KENNEDY, C. J. DISS & R. CANNAN.
MACHINE FOR MAKING BRUSHES.

No. 469,479. Patented Feb. 23, 1892.

Witnesses:
J. Staib
Chas H Smith

Inventors:
Patrick Kennedy
Charles J. Diss
Robert Cannan
per Lemuel W. Serrell
Atty (No Model.) 12 Sheets—Sheet 10.

P. KENNEDY, C. J. DISS & R. CANNAN.
MACHINE FOR MAKING BRUSHES.

No. 469,479. Patented Feb. 23, 1892.

(No Model.) 12 Sheets—Sheet 12.
P. KENNEDY, C. J. DISS & R. CANNAN.
MACHINE FOR MAKING BRUSHES.

No. 469,479. Patented Feb. 23, 1892.

UNITED STATES PATENT OFFICE.

PATRICK KENNEDY, CHARLES J. DISS, AND ROBERT CANNAN, OF BROOKLYN, NEW YORK.

MACHINE FOR MAKING BRUSHES.

SPECIFICATION forming part of Letters Patent No. 469,479, dated February 23, 1892.

Application filed May 14, 1888. Renewed January 30, 1890. Again renewed September 26, 1890. Again renewed July 8, 1891. Serial No. 398,751. (No model.)

*To all whom it may concern:*

Be it known that we, PATRICK KENNEDY, CHARLES J. DISS, and ROBERT CANNAN, of Brooklyn, in the county of Kings and State of New York, have invented an Improvement in Machinery for Making Brushes, of which the following is a specification.

In the manufacture of brush-blocks it is usual to bore the holes in the wood at an inclination for the outer rows of bristles or tufts, so that these tufts diverge from the block. Difficulty has heretofore been experienced in making machinery that is adapted to boring these diverging holes, and to drawing in the bristles or tufts successively by a wire or thread.

In our improvements the brush-block of wood or similar material is fastened to a pattern-plate, through which parallel and diverging holes pass, and this pattern-plate is held in a universal joint, so that it can be swung by the action of holders above and below the same, which serve to bring the diverging holes into line with the boring-tool; and the pattern-plate and the universal joint supporting the same are upon a plate that receives its motion from a volute guide-rack through the agency of pantograph-levers, that are adapted to reduce the movement so as to conform to the size of the brush-block, and after each hole is bored and before the parts move for the boring of the next hole an eye-pointed needle is passed up through the brush-block and pattern-plate, and bristles or similar materials in a bunch are passed through the loop of thread or wire carried by such eye-pointed needle, and this thread or wire is then drawn down and bends up into a tuft such bristles or similar materials and draws them into position in the brush-block, and the parts are then moved for the next hole to be bored, and the operations to be repeated.

In the drawings, Fig. 2 is a side elevation with the fly-wheel removed. Fig. 2ª is a section through the upper part of the machine, showing sliding plate and volute rack and parts adjacent thereto. Fig. 3 is a plan of the driving-pulley and the parts adjacent to the bearing for the cam-shaft. Fig. 15 is a front elevation of the same. Fig. 16 is an elevation at right angles to Fig. 15. Fig. 17 is a plan view of the bristle-feed. Fig. 17ª is a rear view of the bristle-feed. Fig. 21 is a front elevation of the mechanism for drawing in the bristles. Fig. 22 is a side elevation of the same. Fig. 23 is a detached section, in larger size, and Fig. 24 is a plan, of the presser-foot and tuft-stop. Figs. 25 to 39, inclusive, show a modified form of the bristle-feed mechanism adapted for finer quality of work.

Figure 4:
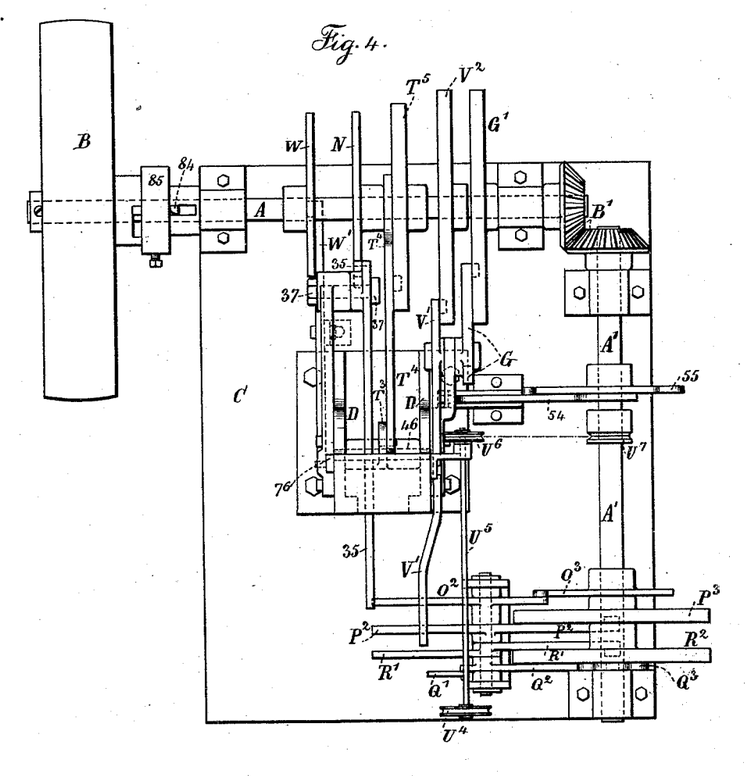
Fig. 4 is a plan of the shaft, gearing, cams, and connections to such cams, the other parts being removed from the vertical frame for greater clearness.
Figures 5, 6, 7:
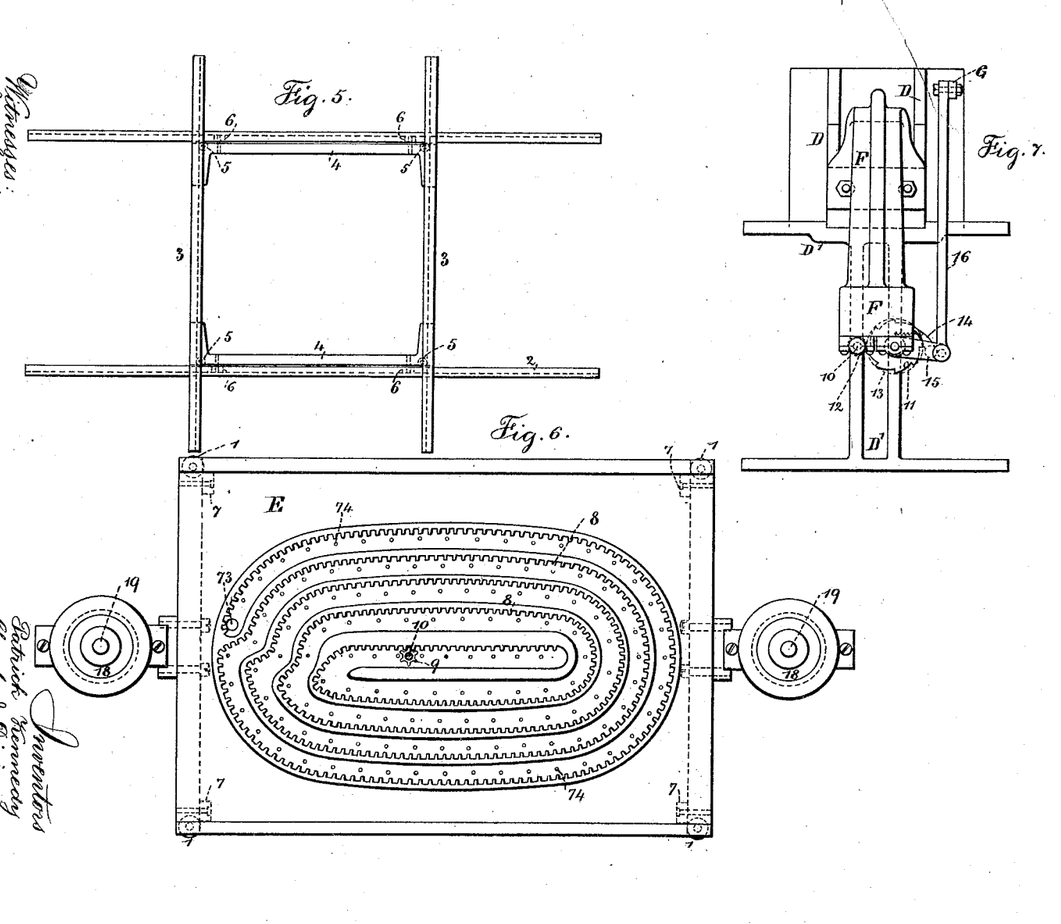
Fig. 5 is a plan of the guide-bars on the upper part of the frame.
Fig. 6 is a plan in larger size of the volute rack.
Fig. 7 is a plan of the mechanism for actuating the rack-pinion.
Figure 8:
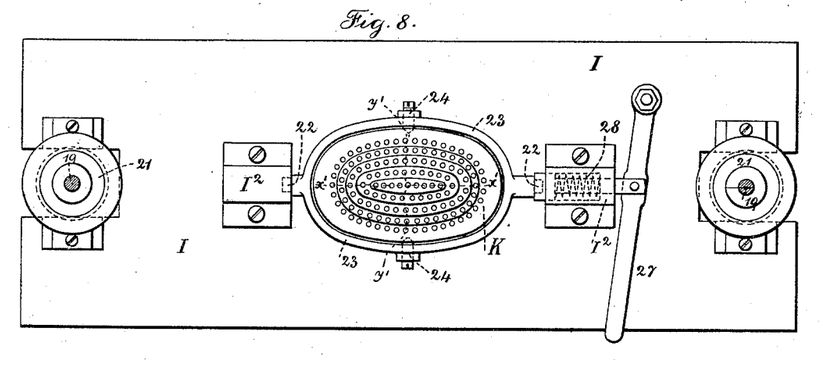
Fig. 8 is a plan of the pattern-plate holder.

Referring especially to Fig. 4, it will be seen that the driving mechanism is composed of a shaft A and driving-pulley B, a second shaft A', and connecting-gears B'. These are supported by suitable bearings upon the bed-plate C, and upon the shafts A and A' are the cams made use of for giving motion to the respective parts, as hereinafter designated. Near the middle of the bed C is a vertical standard or frame D, that carries the principal portions of the operative parts, and near the top of this standard D is a bracket D', that extends out at one side of the frame D, and upon this bracket the grooved bars 2 are fastened, and above the same are similar grooved bars 3, that cross over the bars 2 and are framed or connected together by the bars 4, and there are upon these bars 4 rollers 6, that are within the grooves in the bars 2 to support the weight, and also rollers 5, that take against the edges of the bars 2, so that the frame composed of the bars 3 and 4 can be slid longitudinally of the bars 2 with but little friction. Above the bars 3 is the sliding plate E, having flanges that pass down outside of the bars 3, and upon these flanges are rollers 7, that pass into the grooves in the bars 3 and sustain the weight, and the rollers 1 run at the edges of the bars 3, so that this plate E is kept in its proper position upon the bars 3; but it can roll backward and forward freely upon such bars 3, and in consequence of the plate E being adapted to roll upon the bars 3 in one direction and the frame of bars 3 and 4 to roll in the other direction upon the bars 2 the plate E can be moved to any desired position, and at the same time it will remain parallel at its edges to the bars 2. Upon the top of the standard D is the head-stock F, coming up in the form of an arm that extends out over the sliding plate E and bars 2 and 3, and it is of a length sufficient to allow the plate E to be moved freely in any direction beneath it, and there is upon the end of this head-stock F a shaft 10, having at the bottom end thereof a pinion 9, and this shaft 10 receives an intermittent rotation by the gear-wheels 12 and 13 and a ratchet-wheel 11, connected with the gear-wheel 13, and a pawl 14, and arm 15, and a link 16 for moving this ratchet-wheel one tooth every complete movement of the machine, and the parts are so proportioned that the pinion 9 makes one-half revolution to each tooth that is taken up upon the ratchet-wheel. The link 16 is sufficiently long to reach the lever G, that is beyond the vertical portion of the head-stock F, and extends down to the cam G' on the shaft A, and this cam G' is shaped so as to move the lever G and link 16 and give one-half rotation to the pinion 9 at the proper time in relation to the other parts of the machine. Upon the surface of the sliding plate E is an elliptical volute toothed rack 8, (see Fig. 6,) the rack having a smooth side and a toothed side, and the space between these parts is sufficient for the pinion 9; but the pinion is kept in gear with the rack-teeth, and the shape of the elliptical volute rack is such as to correspond to the positions in which the holes are to be bored in the brush-block; but it is much larger than such brush-block, in order that there may be the necessary leverage in moving the parts, and it is to be borne in mind that when the operation is commenced the pinion 9 is to be at the inner end of the rack, and that the first hole bored in the brush-block corresponds to this position, and that after the pinion has been revolved one-half turn the second hole is to be bored, and so on until all the holes have been bored and the brush-block completed, and when the pinion has traversed the whole length of the volute rack and is adjacent to the hole 73 the operation is completed and the stop mechanism hereinafter described is brought into action to arrest the further movements of the parts, and after the brush-block has been removed the shaft 10 and pinion 9 are lifted bodily by the head or knob upon the upper end of the shaft 10, there being a feather or key upon such shaft that allows of this movement, and the pinion 9 is lifted above the volute rack 8, so that the plate E may be moved and brought back to the original position and the pinion 9 passed down into the rack-teeth at the inner end of such rack. At the ends of the plate E are ball-joints 18, through which pass vertical lever-bars 19, that are fastened to the ball-pivots 20, that are supported in sockets upon brackets H', extending out from standards on the cross-frame H, that extends out from the vertical standard D. The brush-block pattern-plate is on a plate I, that rests upon the brackets I' I', that extend out horizontally from the standard D, and this plate I is flat upon its under side and slides freely upon such brackets I', and there are ball-joints 21 near the ends of this plate, through which the vertical levers 19 pass, and it will now be understood that these levers 19 and ball-joints act as a pantograph to give motion to the plate I corresponding to the motion given to the plate E by the pinion 9; but the motion given to the plate I is in an opposite direction and is reduced, it being preferable to make the volute rack about three times as large as the brush-block, the levers 19 being three to one at the respective ends that project from the pivot-balls 20. Upon the upper surface of the plate I are bearings I² for the pivots 22 of the elliptical gimbal 23, and 24 are the secondary pivots supporting the pattern-plate, and upon the under side of this pattern-plate is a guide-plate 25 and the clamps 26, between which clamps 26 the brush-block L is received, which brush-block is usually of wood.

Figure 9:
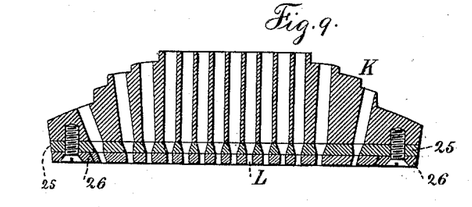
Fig. 9 is a longitudinal section, in larger size of a brush-block and its pattern-plate at the line $x'x'$, Fig. 8.
Figure 10:
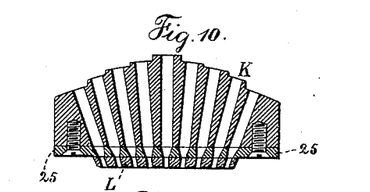
Fig. 10 is a cross-section of the same, in larger size, at the line $y'y'$, Fig. 8.
Figure 11:
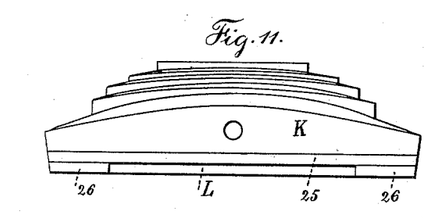
Fig. 11 is a side elevation, and Fig. 12 an inverted plan, of the brush-block and pattern-plate.
Figure 12:
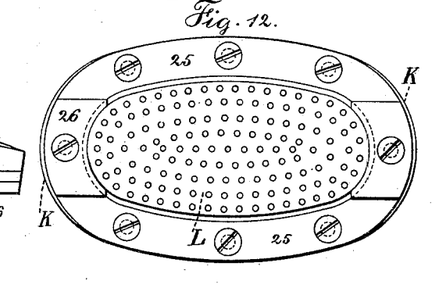
Figure 13:
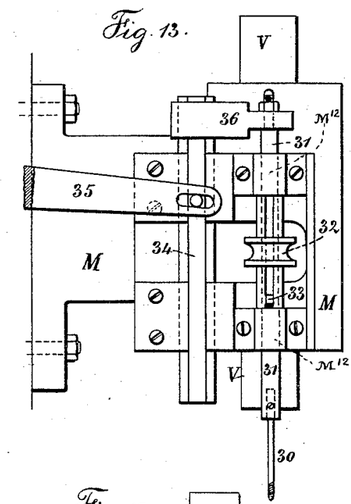
Fig. 13 is an elevation of the drill mechanism.
Figure 14:
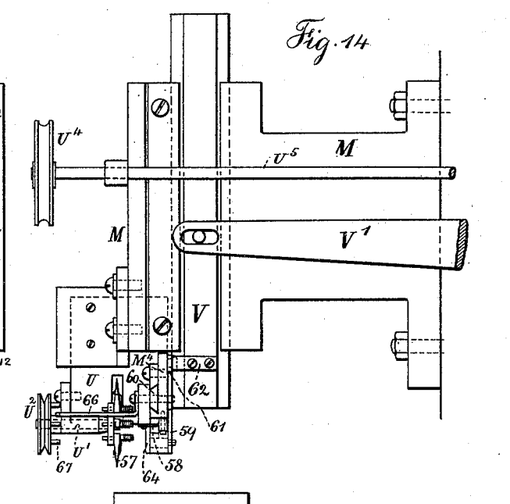
Fig. 14 is a side elevation of the bristle-feed mechanism.
Figures 15, 16, 17, 17A:
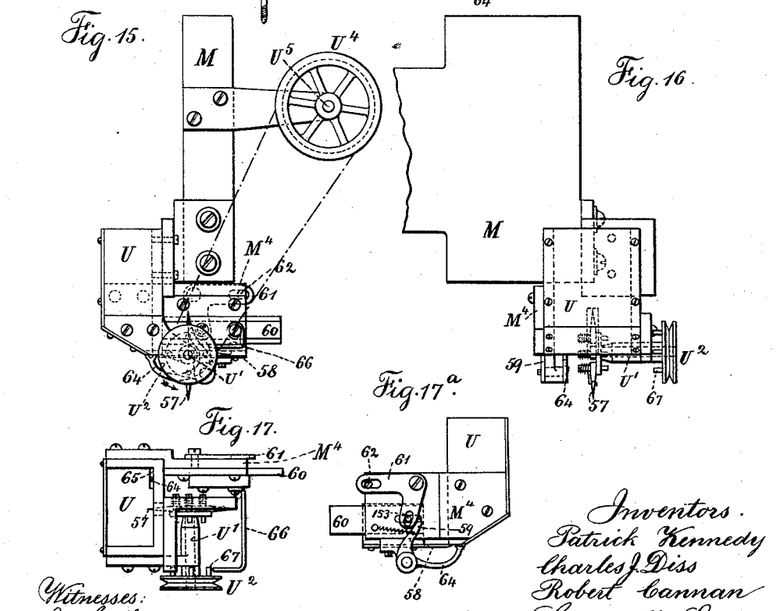
Figures 18, 19, 20:
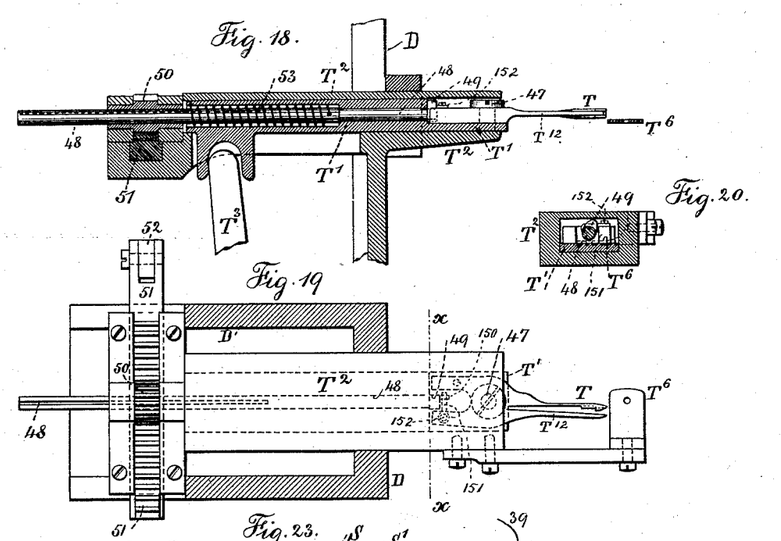
Fig. 18 is a vertical section showing the bristle-forcep mechanism.
Fig. 19 is a plan view of the same, the standard of the machine being in section.
Fig. 20 is a cross-section at the line $xx$ of Fig. 19.
Figures 21, 22, 23, 24:
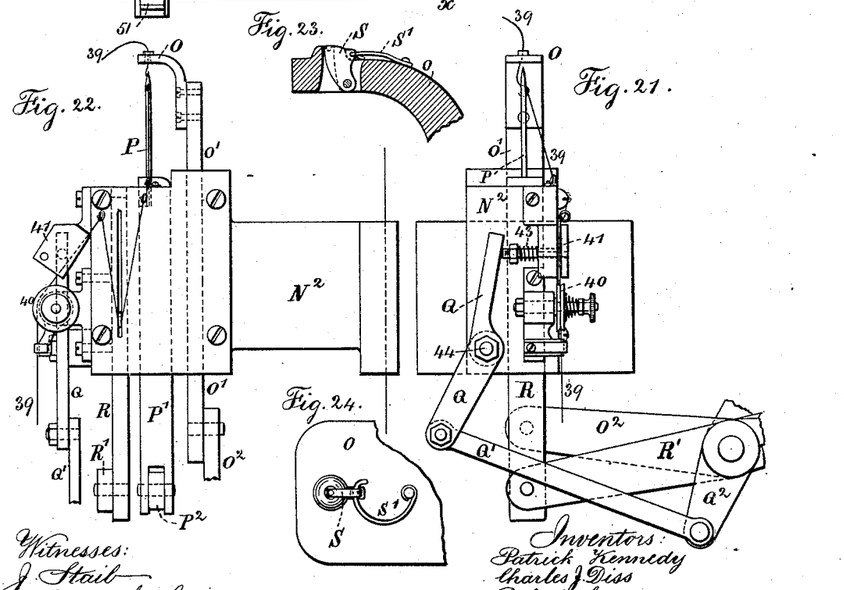
Figure 25:
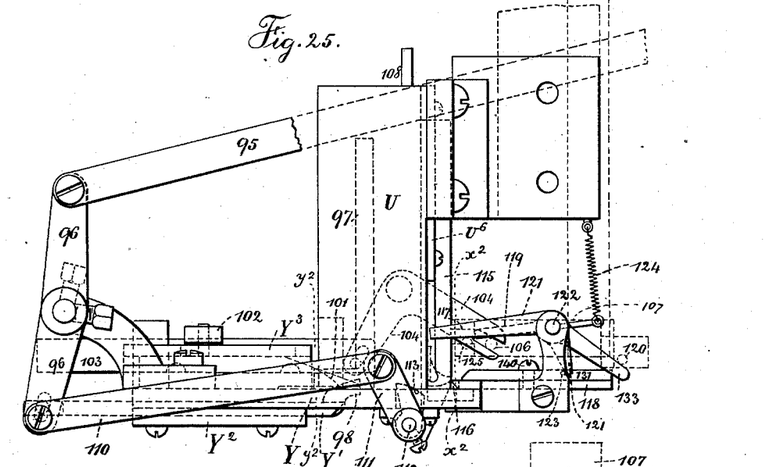
Fig. 25 is a front view of the modified form of the mechanism for supplying the bristles.

Upon reference to Figs. 9 and 10 it will be seen that the pattern-plate and guide-plate are perforated with holes and that these holes are parallel in the middle ranges and that the end and side ranges diverge, the holes through the pattern-plate K being larger than those through the guide-plate 25, and the holes through this guide-plate are tapering and correspond at the lower small end in size with the boring-tool 30, (see Fig. 13,) and which is hereinafter described, the object being to allow the boring-tool to pass freely through the pattern-plate K and then be guided accurately in boring the hole through the brush-block L. The pattern-plate K and guide-plate 25 may be made in one piece instead of being in separate pieces, as shown in the drawings. It will be observed that the upper surface of the pattern-plate K is made with offsets or steps, one for each line of holes, the object being to allow the pattern-plate to swing in its gimbals in the proper direction to bring each hole in succession vertically and in line with the boring-tool and with the needle, the upper surfaces of the offsets coming successively against the under side of the stationary guide T⁶, Figs. 18 and 19, as the boring and bristling operations are performed as hereinafter set forth. In one of the bearings I² there is a sliding pin with a spring 28, and the lever 27 is made use of to draw back this pin and disconnect the gimbal 23, so that it and the pattern-plate and brush-block can be taken out after the brush-block has been completed and another brush-block L applied to the pattern-plate and the parts returned to place to be acted upon in boring the brush-block and inserting the bristles. Upon the standard D is a bracket M for the reception of the arbor 31 and pulley 32, by which the boring-tool 30 is revolved. The belt around the pulley 32 may go to any suitable wheel that is made use of in rotating the shaft and boring-tool. The arbor 31 slides freely through the head-stock M¹², upon the bracket M, and the pulley 32 is upon a slotted tube around the arbor 31, and there is a stud 33 upon the arbor 31, sliding in the slotted tube as the arbor and drill are moved endwise by the arm 36 upon the slide-bar 34, that is acted upon by a lever 35, (see Fig. 13,) and N is a cam upon the shaft A, which acts upon the bent lever 35, which is fulcrumed at 37, to raise the bar 34, arbor 31, and boring-tool 30, and the spring N' is made use of in forcing down the boring-tool as the boring progresses, the cam N being shaped in such a manner as to give or allow of these motions at the proper time. Beneath the brackets I' and supported by the standard D is the head N², through which passes the bar O', having at its upper end a presser-foot O, that is adapted to be brought up against the under side of the brush-block to hold the same while the boring operation takes place, and it also supports the brush-block while the tuft is being drawn into the hole after such hole has been bored. This bar O' is acted upon by a lever O², and the cam O³, which is shaped to act at the proper time to draw down the presser-foot against the action of the spring O⁴, which spring presses upwardly against the collar upon the bar 65, which bar 65 is a continuation of or acts below the presser-bar O'. The needle P is upon the upper end of the needle-bar P', and there is a lever P² and cam P³, which give to the needle-bar and needle a vertical movement at the proper time to cause said needle P to pass through the hole in the presser-foot O and up through the hole in the brush-block and through the pattern-block K, and this needle P has an eye-point that carries the thread or wire used in drawing in and holding the tufts of bristles, and this needle P is caused to descend slightly and form a loop of thread or wire at one side, through which loop passes the forceps T, hereinafter described, (see Figs. 18 and 19,) and these forceps T grasp the bunch of bristles or other fibers and draw the same into the loop of needle-thread, so that such loop of needle-thread is at the middle of the length of bristles, and as the needle descends the bunch of bristles is folded double, forming a tuft, and the tension upon the wire or thread draws such bunch of bristles down into the larger holes in the pattern-block K, and the tapering holes in the guide-plate 25 concentrate the folded bristles and guide the same into the previously-bored hole in the brush-block L. At this time the presser-foot O is held up firmly against the under side of the brush-block L, and there is in the opening through the presser-foot a tuft-stop S in the form of a small cam pivoted at its lower end and having a spring S' acting against one side of it, so that such tuft-stop swings upon its pivot to allow the needle to pass up and down; but the spring swings the stop over toward the thread and sufficiently closes the hole in the presser-foot to prevent the tuft drawing down into the same, and thereby forms a tuft-stop to regulate the proper drawing in of the bristles into the brush-block. This needle P and needle-bar P' are acted upon at the right time by a lever P² and cam P³, the shape of which cam is such that the proper movements are given to the needle, and it is preferable to employ a groove or shell cam, so as to give motion in both directions to the needle-bar and needle. The thread or wire 39 is supplied from a suitable spool and it passes between tension-disks 40 and beneath the tension-clamp 41, through an eye upon the head N² and through an eye upon the reciprocating tension-bar R, and thence up through a guide-eye to the needle. The tension-clamp 41 is provided with a pin and spring 43, and there is a lever Q upon the pivot 44 with a link Q' to the bent lever Q², which is acted upon by a cam Q³ upon the shaft A', and this cam is so shaped as to relieve the tension-clamp 41 at the time the needle is rising and carrying with it the wire or thread 39, and this clamp 41 is allowed to hold the wire or thread during the time such wire or thread is being tightened and the tuft drawn down into the brush-block, and the reciprocating tension-bar R is acted upon by a lever R' and cam R² to draw down the eye upon the tension-bar and take up the slack thread and draw such thread down to the proper distance in drawing down the tuft and taking up the slack of the wire or thread.

From the foregoing the construction and mode of operation of this machine will be apparent so far as the presentation of the brush-block successively to the action of the boring-tool, the boring of the holes, and the drawing in of the bristles, and these parts are available regardless of the special device for supplying the bristles to the forceps. We have shown two devices for supplying such bristles to the forceps, those devices which are shown in Figs. 1, 2, 15, 16, and 17 being of a simpler form than those shown in the other figures, and we will first describe the simpler form and then proceed to describe the more complicated and more accurately-working device shown in the other figures, which are preferably for fine work. The forceps next described, however, are available with either device for supplying the bristles.

The bristle-forceps T T¹² are at the end of the movable stock T', that is within stationary guide-slides T², that are partially within the vertical standard D, and the bristle-forceps are made of two parts, one part T¹² being in the form of a finger and the other T in the form of a shallow trough, into which a small bunch of bristles is received and held by the closing of the finger T¹². The moving finger T¹² of the forceps is pivoted at 47 on the stock T', and there is a shaft 48 within the stock T' that is rotated, as hereinafter described, and has upon one end a cam 49, that acts against the inner end of the moving jaw of the forceps to close or open the same, and there is a small strap 151, fastened at 152 to the inner end of the movable finger T¹², and the other end of this strap, in the shape of a hook, passes over a pin 150, placed eccentrically on the cam 49, and when this cam turns away from the inner end of the movable finger T¹² the pin 150 pulls the strap 151 and on the inner end of T¹², and thereby opens the forceps to be ready for the next operation. The shaft 48 is provided with a longitudinal slot for a key within the pinion 50, and this pinion 50 is between guides or bearings, through which the shaft 48 passes, and below such pinion is a rack 51, to which end motion is given for revolving the pinion to the proper extent and opening and closing the forceps upon the pivot-screw 47. The forcep-stock T' can be moved endwise within the guide-slides T² by the action of the lever T³, (see Fig. 18,) and this lever T³ receives its motion from a link T⁴ and cam T⁵ on the shaft A, the cam being shaped so as to give the movement at the proper time, and there is a lever 52, hinged to the rack-bar 51 and pivoted at 56, and a spring 53, link 54, and cam 55 to give to this rack-bar 51 the end motions at the proper time. After the bristles have been separated from the mass of bristles in the bristle box or holder hereinafter described the forceps T T¹² are moved forward and pass through the loop of needle thread or wire and grasp the bunch of bristles and draw them back over the plate or support T⁶ until the ends are equidistant from the loop of the needle-thread, and then the forceps are opened to liberate such bristles and to allow the tuft to be drawn into the brush-block, as before described.

It will be understood that the spring 53 is fastened at one end to the shaft 48 and at the other end to the stock T', and it is partially wound up by the rotation of the pinion 50, and by its recoil the pinion 50 and shaft 48 are moved in the opposite direction to the motion given by the cam 55 and the rack 51.

The more simple mechanism for separating the bristles from the mass of bristles in the bristle-box U is represented in Figs. 14, 15, 16, 17, and 17ᵃ. In these the bristles of a proper size are laid into the box U in a mass and parallel to each other, as usual, and there is an inclined bottom to this bristle-box U, so that the bristles will slide down the same to an acute angle at the bottom. Parallel to the bottom of this bristle-box is a shaft U', having at one end a pulley U², that is driven by a band from the pulley U⁴ upon the shaft U⁵, that is held in bearings upon the bracket M, and at the other end of this shaft U⁵ is a pulley U⁶, with a belt to the pulley U⁷ on the shaft A'. (See Fig. 4.) These belts are sufficiently tight to rotate the pulley U² and the fingers 57, that project from the shaft U'; but when this pulley U² is stopped, as hereinafter described, the belts slip upon their respective pulleys. These fingers 57 are made pointed at the end and compose a star-wheel, the fingers being pivoted on pins and provided with springs, so that they yield easily to any obstruction. The position of the shaft U' is such that the points of the fingers 57 project slightly within the bristle-box U as they pass through the slot in the side thereof. (See Fig. 17.) Hence the fingers 57, moving in the direction of the arrows, Fig. 15, tend to draw down the bristles into the apex of the bristle-box by a slightly scraping action; but they do not injure such bristles in so doing, and they prevent the bristles remaining in the upper part of the box and not passing down regularly and successively into the apex. At one side of the bristle-box U an arm or bracket M⁴ extends out and supports the bent lever 61, and also the V-slide 60, and in the bracket M is a vertical slide-bar V, that is moved by the lever V' and the cam V² upon the shaft A, which cam is shaped in the proper manner to give a movement to this slide-bar V for supplying the bristles, and there is upon the slide-bar V a finger 62, that enters the slotted end of the bent lever 61, so as to move the same and reciprocate the slide 60 by a pin that connects the other end of the lever 61 with said slide 60, and upon the V-slide 60 there is a stop-finger 66, and upon the pulley $U^2$ are pins 67, so that by an upward movement of the slide V the stop-finger 66 is withdrawn from contact with one of the pins 67 on the pulley $U^2$ to allow such pulley $U^2$ and the spring-fingers 57 to turn and act upon the bristles, as before mentioned, and then the stop-finger 66 again arrests the movement of the pulley $U^2$, as this finger is pushed in the path of one of the pins 67, when the slide 60, which carries the finger 66, is pushed forward by the downward movement of the slide-bar V and finger 62, which, as before mentioned, enters the slot in the bent lever 61, and the other slotted end of lever 61 acts on the pin 153, carried by the slide 60.

In the bottom of the bristle-box U is an opening 65, and beneath this opening is a rocker-finger 64, the lower end of which is formed as a shaft passing through the bracket that extends down from the bracket $M^4$, and at the other end of this shaft is a second arm 59, that is drawn toward the lower end of the bent lever 61 by a spring, and upon the lower edge of the slide 60 is a separator 58 in the form of a blade, the point of which is near the apex of the hopper U. Hence as the slide 60 is moved in one direction the stop-finger 66 releases the pulley $U^2$ and allows the spring-fingers 57 to draw down the bristles to the apex of the hopper, and as the slide 60 is moved in the other direction the separator 58 passes above the bunch of bristles that are made use of to compose the tuft or bunch that is inserted into the brush-block. Such bristles lie in the notched upper edge of the rocker-finger 64, and simultaneously with this movement the rocker-finger 64 is pressed downwardly a small distance, so that the ends of the bunch of bristles, passing down through the opening 65 below the separator 58 and in the notch of the rocker-finger, are in line with and ready to be grasped by the forceps T as they pass forward to grasp the same and draw them out of the bristle-box, as hereinbefore described. It is therefore to be understood that the needle P passes up through the hole in the bearing-plate $T^6$ sufficiently high for the loop of needle-thread to be thrown out at one side and then the forceps T in a closed condition pass through that loop, open and grasp the small bunch of bristles, and draw them back to the proper point, so that their ends are equidistant, or nearly so, from the needle, and the forceps open and leave the bristles lying in the loop of needle thread or wire, and then the needle draws down the thread or wire, folds the bristles in half as it draws them through the hole in the bearing-plate $T^6$, and such bristles are drawn down into the brush-block, as before described, thus completing one operation of the machine.

The brush-block is then moved to the proper place, the hole bored therein, and the bristles drawn into place and the operations are repeated.

Figure 26:
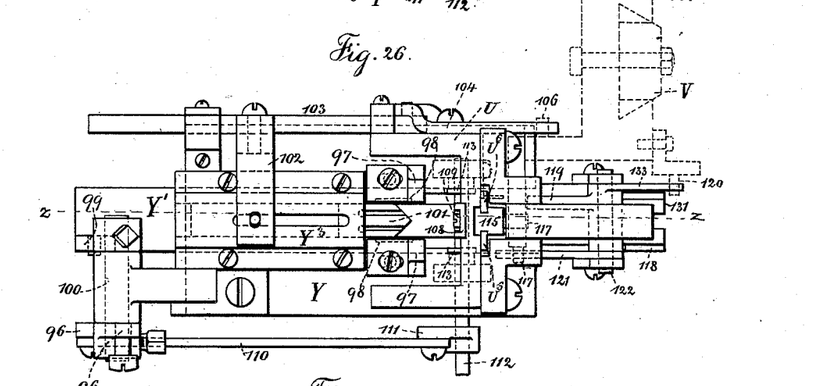
Fig. 26 is a plan view of the same.
Figure 27:
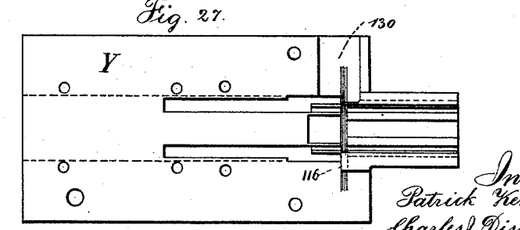
Fig. 27 is a plan view of the bottom plate of the bristle-box.
Figure 28:
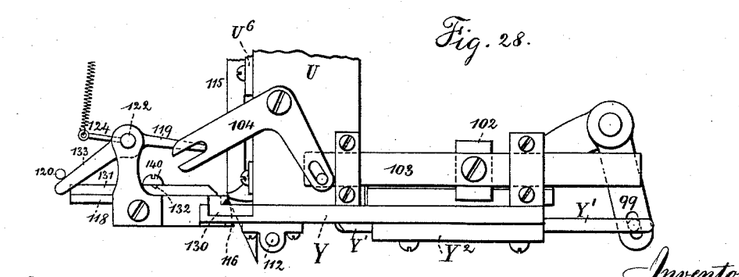
Fig. 28 is a partial rear view of the bristle-box and the mechanism therewith connected.
Figure 29:
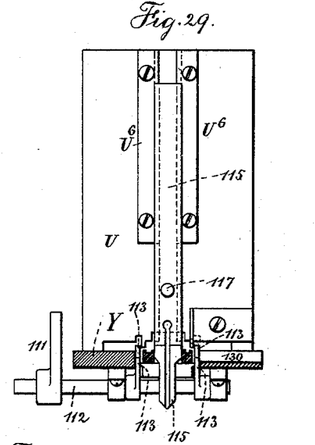
Fig. 29 is a vertical section in front of the bristle-separator.
Figure 30:
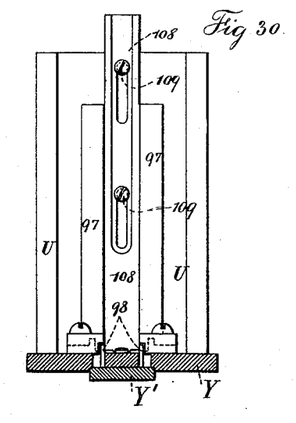
Fig. 30 is a vertical section in the rear of the bristle-box.
Figures 31, 32:
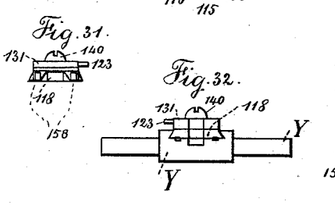
Fig. 31 is a front end elevation of the sliding holder.
Fig. 32 is a rear end elevation of the same and of the bed-plate.
Figure 33:
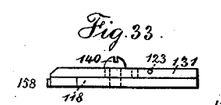
Fig. 33 is a side elevation of the sliding holder.
Figure 34:
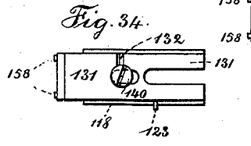
Fig. 34 is a plan view of the same.
Figure 35:
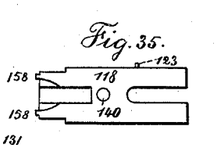
Fig. 35 is an inverted plan of the same.
Figures 36, 37, 38:
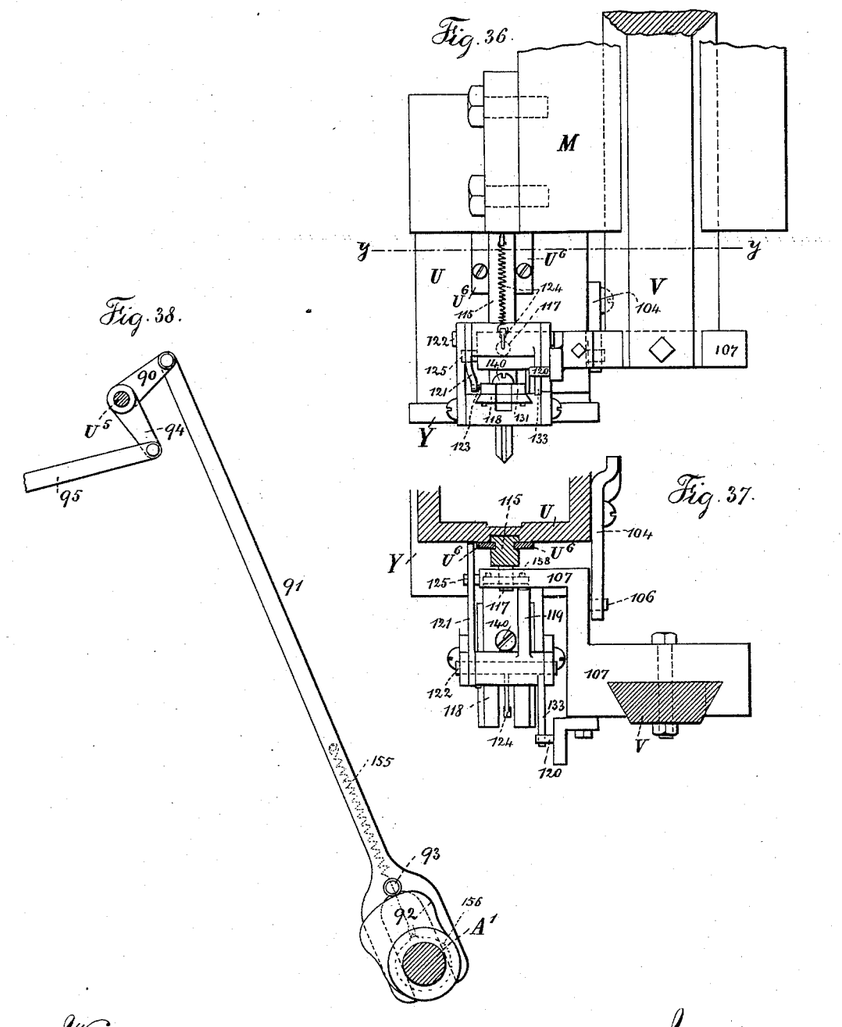
Fig. 36 is a side elevation of a modification of the bristle-feed.
Fig. 37 is a sectional plan view at the line $y\,y$, Fig. 36.
Fig. 38 shows the link connection of the bristle-feeding mechanism.
Figure 39:
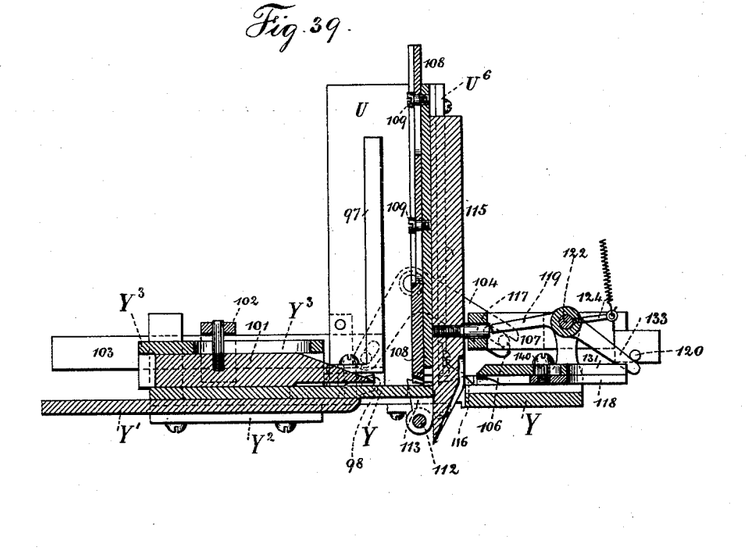
Fig. 39 is a longitudinal section through the bristle-feeding mechanism and holder or box.
Figure 40:
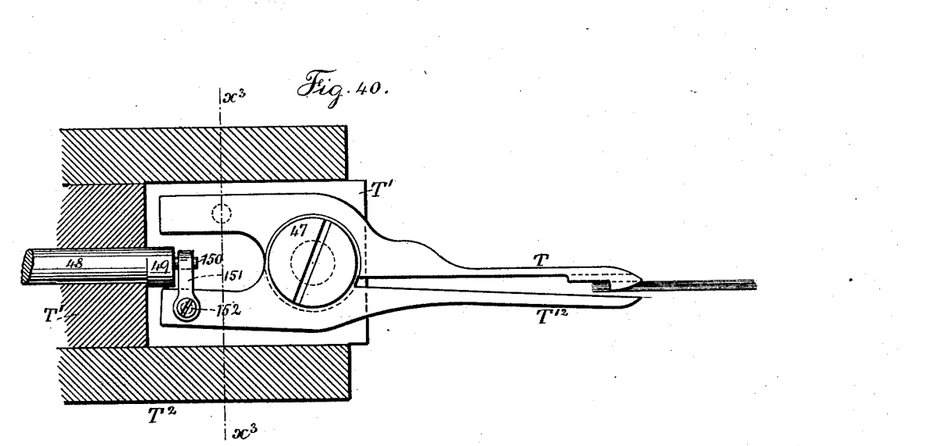
Fig. 40 is a plan view, in large size, of the bristle-forceps with the forceps-stock and the guide-slides in section.
Figure 41:
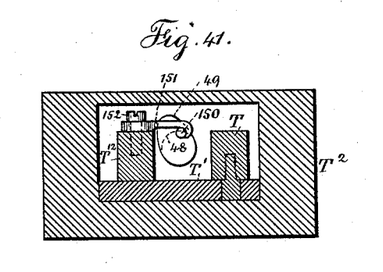
Fig. 41 is a cross-section at the line $x^3\ x^3$, Fig. 40.
Figure 42:
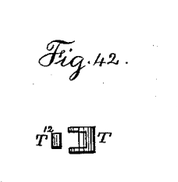
Fig. 42 is an end view of the bristle-forceps.

We will now describe the device which we have found preferable to place upon this machine for the finer quality of work and the more accurate supply of bristles to the forceps. These parts are shown in Figs. 25 to 39, inclusive. The slide-bar V is actuated as before described; but the shaft $U^5$, instead of being rotated, receives an oscillating motion from the revolving shaft A' by means of the cam 92, roller or pin 93, connecting-rod 91, and crank 90, and there is upon this shaft $U^5$ an arm 94 and a connecting-rod 95 to the lever 96 for giving motion to the parts hereinafter described. The rod 91 is returned by the spring 155, one end of which is fastened to this rod 91 and the other end of which is fastened to the sleeve 156 around the shaft A', as shown in Fig. 38, or to some other part of the bed-plate of the machine. The bristle-box U is supported from the bracket M, and it has within it the vertical stationary bars 97, that retain the vertical pile of horizontal bristles in their proper position within the bristle-box, these bars taking the place of the fourth side of the bristle-box, thus giving better facilities to lay in the bristles, and at the bottom of the bristle-box is a bed-plate Y, (shown in the detached view 27,) and this bed-plate has within it grooves or slots for the reception of the parts hereinafter described. Below the bed-plate Y the slide Y' is supported by the plates $Y^2$, and it is reciprocated by the crank-arm 99 upon the shaft of the lever 96, and at opposite sides and beneath the bristle-box are two fingers 98. (See Fig. 30, and in dotted lines in Fig. 25.) These fingers 98 extend up above the top of the bed-plate Y, and the slide Y' and fingers 98 are moved backward and forward beneath the pile of bristles, and the action of these fingers is to press the lower bristles of the pile forward and away from the bars 97, so that they will be supplied to the place from which they are removed. Above the plate Y is a bristle-lifter 101, which is guided within the box $Y^3$, and the forward end of it is beveled upwardly, as seen by dotted lines in Fig. 25 and in the section Fig. 39, and the under edge of this bristle-lifter is cut away, so as to leave a narrow space between the under edge of the bristle-lifter at the point thereof and the top surface of the bed Y. The object of this bristle-lifter is twofold: first, it runs under and its inclined top surface lifts the pile of bristles and they are agitated and loosened and fall down more nearly straight and parallel as the bristle-lifter is drawn back and they spread out evenly upon the surface of the plate Y, and, second, the lower range of bristles is separated from the upper range of bristles and a thin layer of bristles is received into the space between the under surface of the bristle-lifter and the top surface of the plate Y, and the parts are so timed that the bristle-lifter 101 is first moved forward to raise up the pile of bristles and separate those that are to be made use of in supplying the forceps at the next operation, and then the fingers 98 press this thin layer of bristles toward the point of delivery, so that they become properly compact or close together. This bristle-lifter 101 receives its motion from the slide-bar 103, having a cross bar or arm 102, and a pin projects up from the bristle-lifter through the slot in box Y³ and into the cross-bar 102, and there is upon the inner face of the bristle-box U a vertical gate 108, secured by countersunk screws 109, passing through slots in this gate 108, and at the lower end of this gate 108 are prongs projecting downwardly, (see Fig. 30,) and these correspond to the grooves in the inclined point of the bristle-lifter 101, (see Fig. 26,) so that these prongs prevent the bristles being caught between the under edge of the gate 108 and the top surface of the bristle-lifter 101, and the operation cannot become impeded by a misplaced bristle. The bent lever 104, Fig. 28, that gives motion to the slide 103, receives its motion from a pin 106 upon the head 107 of the slide V, this slide-bar V receiving its motion from the lever V' and cam, as aforesaid. Upon the outer face of the bristle-box U are guide-plates U⁶, between which slide the vertical separator 115, which receives its motion from the head 107 by the pin 117, and the lower edge of this vertical separator 115 is beveled in both directions, as seen in Figs. 29, 36, 25, and 39, and it serves to separate the layer of bristles that is carried over beneath the bristle lifter and separator 101 those bristles that are to form the tuft.
There is a bristle-recess 116 formed by the undercut bevel of the raised portion of the bed Y, and into this bristle-recess 116 the bristles that are separated by 115 are received, and the ends of these bristles project, as seen in the plan view, Fig. 27, and the bed Y is cut away at 130, Figs. 27 and 28, to give room for the forceps to pass in and grasp the small bunch of bristles, as before described. The lever-arm 96 extends below its pivot or shaft, and it is connected by a link 110 to the crank-arm 111 upon the shaft 112, and there are upon this shaft the steadying-fingers 113, (see Figs. 25 and 29,) that pass up through slots in the bed Y, and as the fingers 98 are moved forward the shaft 112 is partially rotated, so as to swing the upper points of the steadying-fingers 113 back and below the upper surface of the bed Y. This movement takes place after the bristle-lifter 101 has gone forward and separated the bristles that lie upon the surface of the bed Y from those that are above them in the bristle-box. Thereby this layer of bristles is carried forward beneath the bristle-lifter 101 and below the gate 108, and the vertical separator 115 is at this time raised up, and there is a sliding holder 118, moving in a dovetailed groove at one end of the bed Y, Fig. 32, and provided with projections or pins 158 at its forward end, Figs. 31, 33, 34, 35, and 37, and this sliding holder 118 has been moved forward, so that the pins 158 at its forward end project slightly under the bristle-box, but not quite as far as the inner surface of the separator 115, and the forward end of this holder 118 is cut away in its under middle surface, so that the point of the separator 101 passes into the same. Hence the bristles at this time are held below the point of the separator 101 and between the fingers 98 and the pins at the end of the holder 118, and there is upon the top of this sliding holder 118 a cap-plate 131, which can be adjusted on the sliding holder 118, so as to vary the distance that the pins 158 on the sliding holder 118 project under the bristle-box, after which the two parts 118 and 131 of the sliding holder are firmly clamped together by the screw 140, and they move together, and the cap-plate at this time has been projected so that its end is closed up against the outer face of the bristle-holder U, and the forward end of this cap-plate 131 is beveled, so that as the vertical separator 115 passes down it presses back this cap 131, and the small number of bristles that are to compose the tuft are separated from the rest of the layer of bristles beneath bristle-lifter 101 by the double-inclination point of the separator 115 passing in between the bristles and separating the proper number, and by the beveled point of separator 115 these bristles are carried bodily in a lateral direction as the holder 118 and cap 131 slide back until the bristles to form the tuft are received beneath the undercut portion 116 of the bed Y, as before mentioned. In order to control the movements of this sliding holder 118, we make use of a bent lever 121 upon the fulcrum-shaft 122, and there is a pin 125 on the head 107, (see Fig. 37,) so that as the slide V and head 107 are lifted the pin 125 raises the bent lever 121 and acts upon the pin 123 upon the cap-plate 131 and moves the same, and also the holder 118, forward, and in the top of this cap-plate 131 is the notch 132, into which drops the latch-lever 119, which latch-lever has the shaft 122 for its fulcrum, and it is provided with an arm and a spring 124 to throw the end of the latch into the notch 132, and there is also an arm 133 connected with the latch-lever 119, and upon this arm 133 the pin 120, that is upon the head 107, acts to lift the point of the latch out of the notch 132 at the proper time. This latch 119 is lifted upon the downward movement of the head 107, just before the vertical separator 115 reaches the end of the plate 131. Hence this plate 131 can slide back by the action of the inclined end of such separator 115, and when the reverse movement of the head 107 and slide-bar V takes place and the said separator 115 has been lifted the pin 125 upon the head 107 acts below the bent lever 121 to move the cap-plate 131 and sliding holder 118 up again to their proper position for receiving the bristles transversely to the end of such plate 118, as before described. Upon reference to Figs. 32 and 36 it will be seen that this sliding holder 118 is in V-grooves that are above the plane of the top surface of the plate Y, and hence as the bristles are upon the surfaces of this plate Y they are opposite to the ends of the pins at the forward end of the sliding holder 118, and the forward ends of the dovetailed slides for the holder 118 are undercut to form the undercut recess 116 for the reception of the bristles, as before described.

Figure 1:
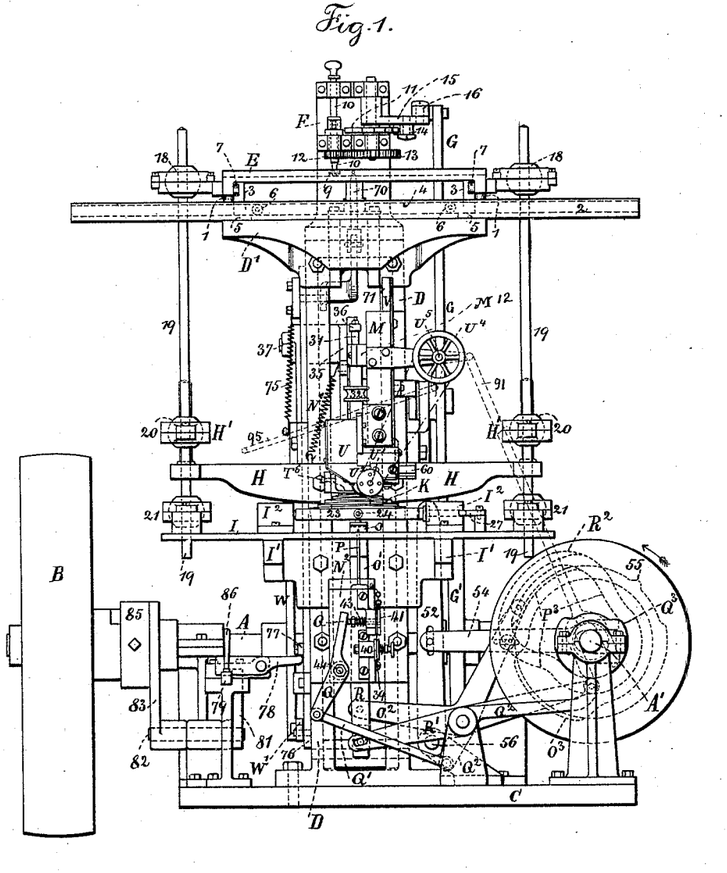
Figure 1 is a front elevation of the machine.
Figures 2, 2A, 3:
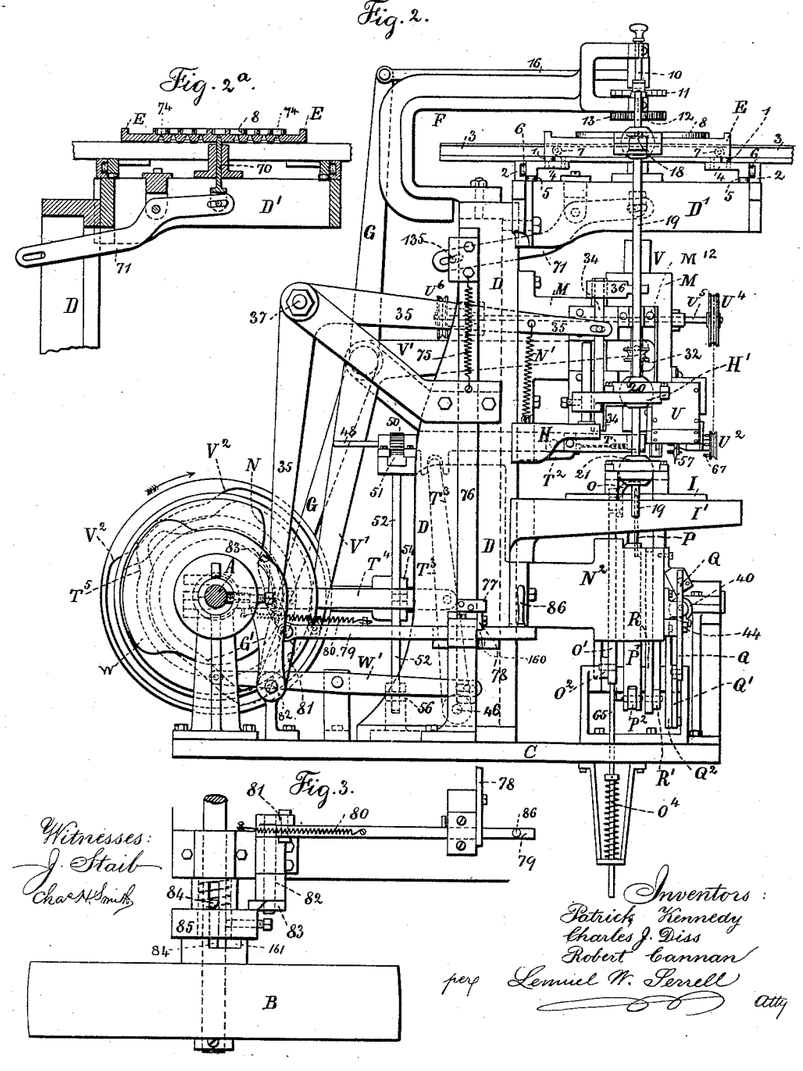

To aid in holding the sliding plate E and volute rack 8 in exact position at the time the boring and drawing is done, we provide this plate E with holes 74, which holes are small on top and flaring at the under side of the plate, as seen in Fig. 2ª. A pin 70 at the end of the lever 71 enters one of these holes at the proper time, but cannot pass through it, and is withdrawn, when feeding for the next operation, by means of a cam W, lever W', bar 76, pin 135, and pivoted lever 71. When the last hole is to be bored, the pin 70 enters the large hole 73 and goes clean through the plate E, and thereby allows the spring 75 to pull down the bar 76 sufficiently to allow the projection 77 on this bar to depress the inner end of the latch 78 and lift out the outer end of latch 78 from the notch 160 in bar 79. The spring 80 pulls the bar 79 and crank 81 forward, turning the shaft 82, and thereby the stop-latch 83 is brought in the path of the head of the clutch-pin 84, which extends under the collar 85 into a notch 161 on the hub of the pulley B, and this pin 84 is thus drawn out of the notch 161 and back under the collar 85, and the pulley B is disconnected from the shaft A and the machine stops. When ready to start again, the attendant pulls the bar 79 by a handle 86, and the clutch-pin 84 will be thrown forward by the spring and couple the pulley B to the shaft A again.

We claim as our invention—

1. The holder for a brush-block, composed of a metallic pattern-plate K, guide-plate 25, and clamps 26 for the brush-block, there being holes through the pattern-plate K that are larger than the holes through the guide-plate 25, and the upper surface of the pattern-plate having steps or offsets, substantially as set forth.

2. The combination, with the pattern-plate K and guide-plate 25, perforated for the passage of the boring-tool, and the clamps 26 for the brush-block, of the gimbal for supporting the pattern-plate and for allowing the same to swing in any direction, so that the divergent holes in the bristle-stock may be brought into line with the boring-tool, substantially as set forth.

3. The combination, with the pattern-plate perforated for the passage of the drill and the gimbals for supporting such pattern-plate, of the sliding-plate I, bracket I', disconnecting lever, and pivot-supports, substantially as set forth.

4. The combination, in a machine for making brushes, of the pinion, mechanism, substantially as specified, for revolving the pinion intermittently, a volute rack operated upon by such pinion, a sliding plate and the parallel bars and frame for supporting such sliding plate and allowing it to slide in any direction as acted upon by the pinion, the pattern-plate and its holding device, and a pantograph connection between the sliding plate and the holding device for the pattern-plate, substantially as set forth.

5. The combination, with the pinion 9, of the ratchet-wheel and pawl and the gearing for giving to the same a progressive rotation, the link 16, lever G, and cam G' for moving the parts, a volute rack 8, plate E, and slide-bars for supporting the same, substantially as set forth.

6. The vertical standard D, having at its upper end a bracket D', in combination with the grooved bars 2, fastened to the same, the bars 3 and 4, attached together and forming a frame, and the rollers for supporting and guiding the upper frame, the plate E, and rollers supported by and resting upon the bars 3, and the volute rack and pinion for giving to the plate E the progressive movements specified, substantially as set forth.

7. The combination, with the plate E, volute rack and pinion, and the frames and bars for supporting the same, of the pantograph-levers 19, the ball-joints and pivots for the same, and the pattern-plate and sliding plate and connections for holding the pattern-plate and connecting it with the pantograph-levers, substantially as set forth.

8. The combination, in a machine for making brushes, of a brush-block and its holder, a holder for the bristles, an eye-pointed needle carrying a thread or wire, and means for moving the same through the brush-block and forming a loop of wire or thread, and reciprocating forceps for passing through the loop and receiving and drawing out from the bristle-holder the bristles to form one tuft and laying them into the loop, substantially as set forth.

9. The bristle-forceps T, having one stationary and one moving jaw, the forcep-stock T' and the lever for moving the same endwise, and a shaft and cam for opening and closing the forceps, substantially as set forth.

10. The combination, with the forceps and forcep-stock, of a guide-slide within which the stock and forceps are moved endwise, the shaft and cam for opening and closing the forceps, a pinion for revolving the shaft, a rack-bar acting upon the pinion, and a lever for moving the rack-bar, substantially as set forth.

11. The combination, with the reciprocating forceps, of the bearing-plate T⁶, the pattern-plate for holding the brush-block, a boring-tool for boring the brush-block, a reciprocating eye-pointed needle for carrying the thread or wire through the hole in the brush-block, and a presser-foot and mechanism for bringing the same up against the brush-block while the tuft of bristles is being drawn into place, substantially as set forth.

12. The presser-foot having a tuft-stop S, in combination with the eye-pointed needle and the mechanism, substantially as specified, for giving motion to the presser-foot and to the eye-pointed needle, substantially as set forth.

13. The combination, in a machine for making brushes, of a holder for the brush-block, a perforated pattern-plate, a boring-tool and mechanism for giving end motion to the same in passing the tool through the pattern-plate and boring the brush-block, a bearing-plate against which the pattern-plate rests, a presser-foot and means for moving the same into contact with the brush-block, an eye-pointed needle reciprocated to carry the thread or wire through the brush-block and bearing-plate, a pair of forceps for drawing into the loop of needle-thread or wire the bristles to form the tuft, and a take-up mechanism, substantially as specified, for taking up the slack thread or wire and drawing the tuft into the brush-block and against the presser-foot, substantially as set forth.

14. The combination, in a machine for making brushes, of the bristle-box and separating mechanism that separates from the pile of bristles those bristles that are to form one tuft, a reciprocating eye-pointed needle, and a pair of reciprocating forceps for drawing the tuft into the loop of thread or wire, substantially as set forth.

15. The combination, with the bristle-box and the separator, of a reciprocating lifter at the bottom of the box for raising the bristles and causing them to drop down to the point of delivery from the bristle-box, substantially as set forth.

16. The combination, with the bristle-box, of the reciprocating separator 101, having an inclined end and recessed below the inclined end for the reception of the bristles from which the tuft is to be separated by the forceps, and the vertical gate 108, substantially as set forth.

17. The combination, with the bristle-box and the reciprocating separator 101, having a portion cut away in its lower face, of the gate 108, under which the inclined end of the separator 101 passes, and the vertical separator 115 for removing from the bristles those that are to form one tuft, substantially as set forth.

18. The combination, with the bristle-box, of the reciprocating separator 101, vertical gate 108, steadying-fingers 113, reciprocating slide Y', fingers 98, and separator 115, substantially as set forth.

19. The combination, with the reciprocating bristle-separator 101 and the bristle-box, of a vertical separator 115 and the sliding holder 118, cap-plate 131, and the bed-plate Y, having the cut-away notch 116 for the reception of the bristles, substantially as set forth.

20. The combination, with the driving-pulley and clutch, of the volute-rack plate having holes corresponding to the positions for the tufts in the brush-block, and the pin 70 and connections to the clutch, the last hole in the volute-rack plate being sufficiently large for the passage of the pin simultaneously with the stopping of the machine, substantially as set forth.

Signed by us this 30th day of March, 1888.

PATRICK KENNEDY.
CHARLES J. DISS.
ROBERT CANNAN.

Witnesses:
GEO. T. PINCKNEY,
WILLIAM G. MOTT.